US006567893B1

(12) United States Patent
Challenger et al.

(10) Patent No.: US 6,567,893 B1
(45) Date of Patent: May 20, 2003

(54) SYSTEM AND METHOD FOR DISTRIBUTED CACHING OF OBJECTS USING A PUBLISH AND SUBSCRIBE PARADIGM

(75) Inventors: James R. H. Challenger, Garrison, NY (US); Paul M. Dantzig, Scarsdale, NY (US); Daniel M. Dias, Mohegan Lake, NY (US); Nagui Halim, Yorktown Heights, NY (US); Arun K. Iyengar, Yorktown Heights, NY (US); Richard P. King, Scarsdale, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/715,526

(22) Filed: Nov. 17, 2000

(51) Int. Cl.$^{7}$ .................................... G06F 12/00
(52) U.S. Cl. ....................... 711/118; 711/133; 711/158; 709/207; 709/217; 709/226
(58) Field of Search ................................ 711/133, 118, 711/158; 709/226–235

(56) References Cited

U.S. PATENT DOCUMENTS 5,919,247 A * 7/1999 Hoff et al. .................. 709/217
5,920,725 A * 7/1999 Ma et al. .................... 395/712
6,038,601 A * 3/2000 Lambert et al. ............ 709/226
6,292,835 B1 * 9/2001 Huang et al. ............... 709/235
6,345,294 B1 * 2/2002 OaToole et al. ............ 709/222

* cited by examiner

*Primary Examiner*—Do Hyun Yoo
*Assistant Examiner*—Nasser Moazzami
(74) *Attorney, Agent, or Firm*—F. Chau & Associates, LLP

(57) ABSTRACT

A system and method for caching objects using a cost-based publish and subscribe paradigm, wherein a server computing node determines whether a given cache node should receive a cache update based on, e.g., the cost of sending the update. In one aspect, a method for maintaining objects in a cache comprises the steps of issuing a subscription for an object, maintaining a metric for the object; and determining, based on the metric, whether a cache is to receive an update message associated with the object. The metric is preferably correlated with one or more factors such as an importance factor of maintaining the cached copy of the object current, the cost of the sending the update message, and/or the estimated lifetime of the object.

24 Claims, 5 Drawing Sheets

SYSTEM AND METHOD FOR DISTRIBUTED CACHING OF OBJECTS USING A PUBLISH AND SUBSCRIBE PARADIGM

BACKGROUND

1. Technical Field

The present application relates generally to a system and method for providing distributed caching on a computer network and, more particularly, to a system and method for caching objects in a distributed system using a cost-based publish and subscribe paradigm, wherein a server computing node determines whether a given cache node should receive a cache update based on, e.g., the cost of sending the update.

2. Description of Related Art

Caching is a technique that is typically employed in many computer systems to improve performance. For example, in an object-oriented environment, caching an object can minimize the cost for fetching or materializing the object since it is only incurred once. Subsequent requests can be satisfied from the cache, a step which incurs significantly less overhead, thus resulting in improved performance overall.

A key problem associated with caching items is that of preventing each cache from supplying stale data. Cached data become stale whenever actual values have changed but cached copies of these values have not been updated to reflect the changes. Since it is most undesirable to supply stale data, caches typically purge stale data and request a fresh copy from the data source. This replenishment incurs the usual overhead that the employment of caches seeks to minimize.

Various conventional techniques have been implemented and proposed for maintaining updated caches on a global computer network such as the WWW (World Wide Web) (or "Web") and the Internet. For instance, "lease-based" or "publish and subscribe" caching techniques have been proposed for both distributed file systems and Web caching. Generally, with these methods, a cache obtains a "lease" for an object, wherein the lease comprises a subscription of finite duration. After the lease for the object expires, the cache must renew its lease in order to continue receiving update messages for the object.

One disadvantage associated with lease-based caching is that performance degrades as the system scales. Indeed, with the implementation of such methods in networks with large numbers of servers, caches, and/or objects (such as the Web), the overhead due to update traffic becomes prohibitive. Accordingly, there is a need for improved subscription-based caching methods that may be employed in large-scale networks, resulting in less overhead than the conventional techniques.

SUMMARY OF THE INVENTION

The present invention is directed to a system and method for caching objects using a cost-based publish and subscribe paradigm, wherein a server computing node determines whether a given cache node should receive a cache update based on, e.g., the cost of sending the update.

In one aspect of the invention, a method for maintaining objects in a cache comprises the steps of issuing a subscription for an object, maintaining a metric for the object, and determining, based on the metric, whether a cache is to receive an update message associated with the object. An update message may comprise, for example, an updated copy of an object or an invalidation message to invalidate a cached copy of an object.

In another aspect of the invention, the metric is preferably correlated with one or more factors such as an importance factor of maintaining the cached copy of the object current, the cost of the sending the update message, and/or the estimated lifetime of the object.

In yet another aspect of the invention, the order in which the server transmits update messages to subscribing entities is based on the value of the metric of the associated object. Preferably, priority for sending update messages is accorded to those objects having greater metric values associated therewith. Further, the priority of a given update message may be dynamically modified if, for instance, the given update message has not been sent to a corresponding subscribing entity for a predetermined period of time.

In yet another aspect of the invention, a method for maintaining objects in a cache comprises the steps of issuing a subscription to a plurality of objects, maintaining a metric for each of the plurality of objects, wherein the metric is correlated with a validity level of the object, and sending a message to either update or invalidate a cached copy of a given object of the plurality of objects, if the metric associated with the given object meets a predefined threshold. This affords a reduction in the amount of update messages sent from the server to a given cache by allowing cached copies of object to be obsolete to a desired degree.

Advantageously, the caching techniques described herein provide a reduction in the number of update messages sent between servers and caches. Consequently, this reduction results in less overhead and better scalability as compared with the conventional methods.

These and other aspects, features, and advantages of the present invention will become apparent from the following detailed description of the preferred embodiments, which is to be read in connection with the accompanying drawings.

DETAILED DESCRIPTION OF PREFERRED EMBODIMENTS

The systems and methods described herein may be implemented in various forms of hardware, software, firmware, special purpose processors, or a combination thereof. In particular, the present invention is preferably implemented as an application comprising program instructions that are tangibly embodied on one or more program storage devices (e.g., magnetic floppy disk, RAM, ROM, CD ROM and/or Flash memory) and executable by any device or machine comprising suitable architecture. Since the systems and methods described herein are preferably implemented in software, the system architecture and process steps may differ depending upon the manner in which the invention is programmed. Given the teachings herein, one of ordinary skill in the related art will be able to contemplate these and similar implementations or configurations.

Figure 1:
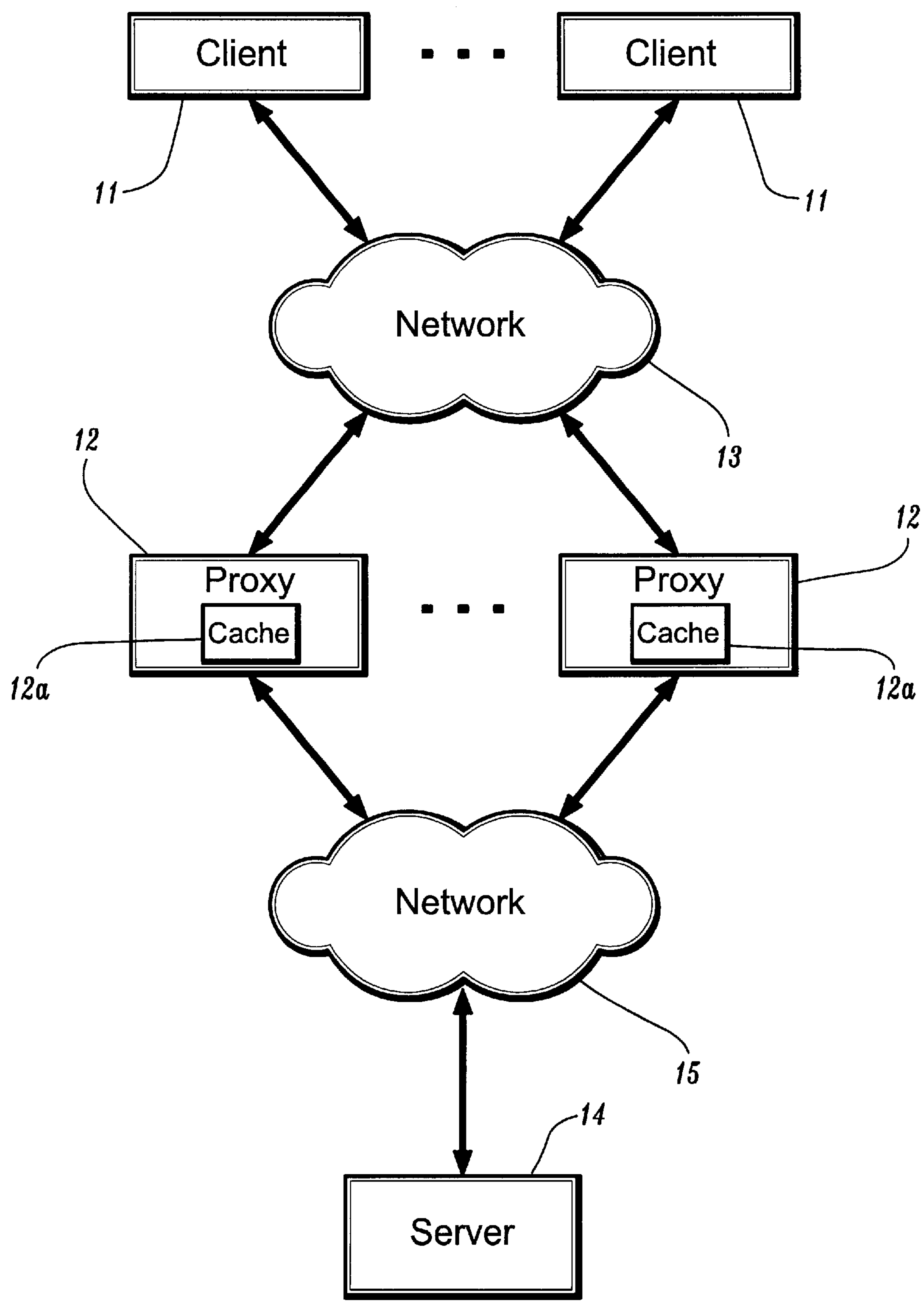
FIG. 1 is a block diagram of an exemplary distributed system in which a cost-based caching application according to the present invention may be implemented.

Referring now to FIG. 1, a block diagram illustrates an exemplary system in which a cost-based caching application according to the present invention may be implemented. The system 10 comprises a plurality of clients 11 and a plurality of proxy servers 12 that communicate over a communications network 13. The proxy servers 12 communicate with a server 14 over a communications network 15. Each of the proxy servers 12 comprise one or more caches 12*a* that, as explained below, are employed for storing cached copies of objects stored and/or materialized by server 14. The cached copies of the objects are served to the clients 11 in response to client requests.

The clients 11 may comprise any suitable application for accessing content/services from remote sources (e.g., server 14, proxies 12). In addition, it is to be understood that the networks 13 and 15 may either be distinct networks or the same network. For illustrative purposes, it is assumed that the server 14 comprises a WEB server, the clients 11 are browser applications (such as HTML (Hyptertext Markup Language) browsers, WML (Wireless Markup Language) browsers, VoiceXML (speech) browsers, etc.) and that the networks 13 and 15 comprise the Internet. As such, the following discussion addresses techniques for maintaining consistency of cached data in Internet proxy caches (e.g., caches 12*a*).

It is to be understood, however, that the implementation of the caching techniques described herein are not limited to a global computer network environment. Indeed, those skilled in the art may readily envision the implementation of such caching techniques in public networks and private networks (e.g., extranet, intranet), and a combination thereof (as well as in combination with the Internet), using, for example, the Internet suite of protocols (IP).

In FIG. 1, a client browser 11 issues a request, identified by a URL (uniform resource locator), that is intended for the Web server 14, but which first passes through the communication network 13 to one of the proxy servers 12 using conventional Internet routing techniques. As indicated above, each proxy server 12 comprises a cache 12*a* in which the proxy server 12 stores and maintains a copy of one or more objects (e.g. WEB pages) identified by associated URLs. If the proxy server 12 (receiving the client URL request) maintains in its cache 12*a* an up-to-date (i.e., current) copy of the object associated with the URL request, the proxy server 12 will immediately pass back the object through the communication network 13 to the requesting client browser 11.

On the other hand, if the proxy 12 does not know whether the copy of the desired object stored in the cache 12*a* is current, the proxy 12 sends a request to the Web server 14 through the communication network 15. This request indicates the time at which the copy of the desired object in the proxy 12 was created. If the server 14 determines that a new version of the desired object exists, the server 14 sends the requesting proxy 12 a new version of the object back through the communication network 15. On the other hand, if the server 14 determines that no new version of the desired object exists, the server 14 will send a notification to the requesting proxy 12 that the existing cached copy of the desired object (in the cache 12*a*) is current. In either case, the proxy 12 will complete the request of the client browser 11 by sending the client browser 11 an assuredly current version of the requested object (associated with the requested URL) via the communication network 13.

The communication between the proxy servers 12 and the server 14 can lead to unacceptable delays in crossing the communication network 15, as well as undesirable processing loads at the server 14. There are various methods that may be implemented to mitigate the traffic and server loads. For instance, objects that are updated very seldom can be identified by the server 14 as such when passed to the proxy 12 based on an expiration time. Thus, when a proxy 12 receives a request for an object (a copy of which is stored in the proxy's cache) before the expiration time of the object, the proxy 12 can provide a copy of such object without requesting confirmation of the object's validity from the server 14, since the server 14 has, effectively, "assured" that the copy at the proxy 12 can be considered current until the expiration time.

Such "assurances" based on expiration time, however, can not be guaranteed for objects that are updated either frequently or at unpredictable times. Consequently, because these objects are likely to be especially interesting to the client browsers 11, it is important to avoid/mitigate requests for checks on the "freshness" of cached copies of such object by the proxy servers 12.

Accordingly, a subscription-based method is valuable to mitigate traffic and server load associated with proxy requests, whereby a proxy server obtains a subscription to an object from a server 14 at the time the proxy issues a request for a copy of the object. Advantageously, if the server 14 grants the subscription, as indicated in its reply to the proxy 12, the server 14 assures that it will send the proxy 12 any updates associated with the subscribed object, whenever such updates occur.

Figure 2:
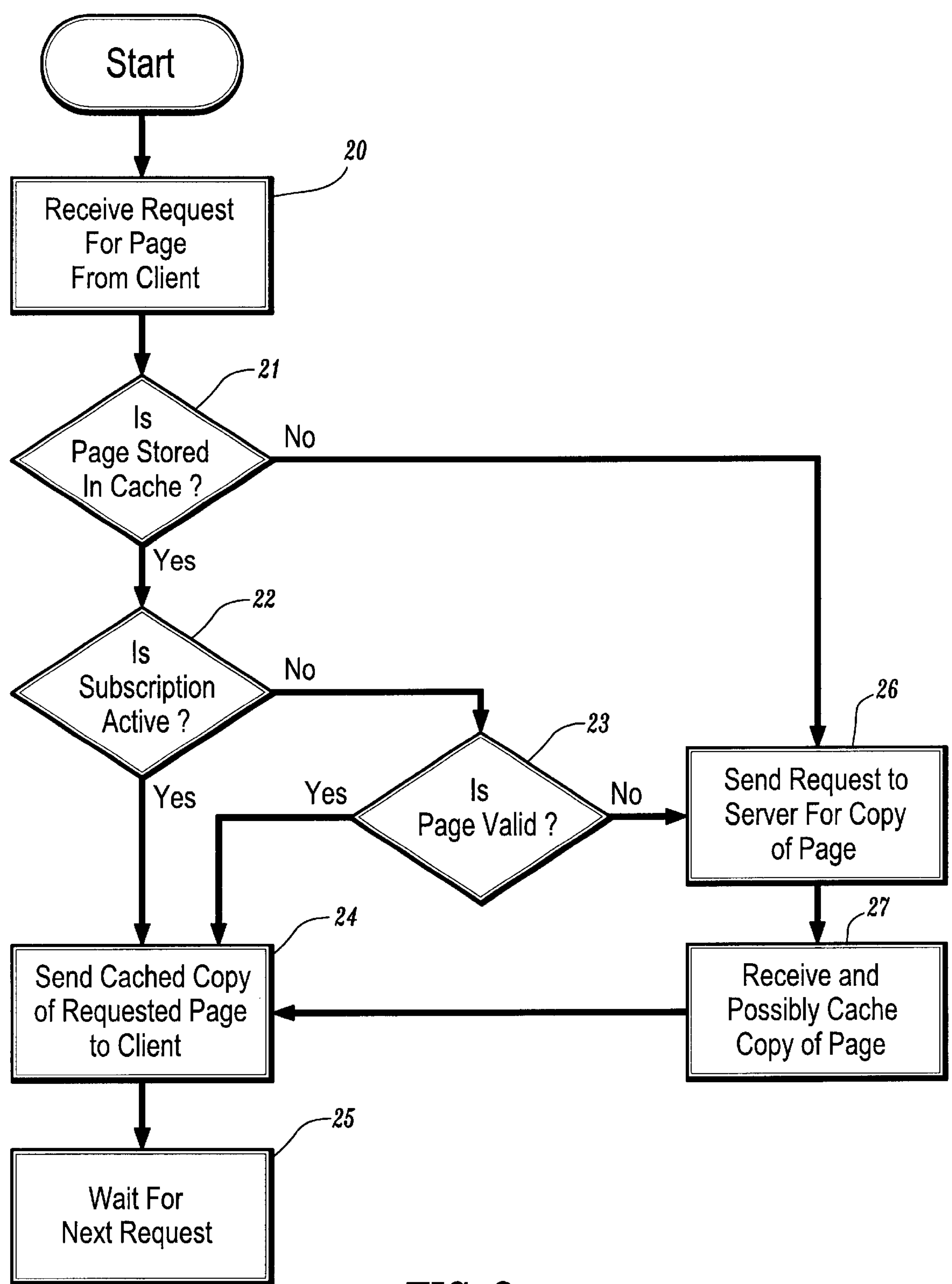
FIG. 2 is a flow diagram of a subscription-based caching method in which a cost-based caching application according to the present invention may be implemented.

Referring now to FIG. 2, a flow diagram illustrates a method implemented by a proxy server for processing a client request in a subscription-based framework. When the proxy receives a request from the client for a given content page (object) (step 20), the proxy will determine if a cached copy of the object corresponding to the requested page is stored in the local cache of the proxy (step 21). If the proxy server determines that the requested object is not stored in the cache (negative determination in step 21), the proxy server will send a request to the server to subscribe and obtain a copy of the desired object (step 26). The server will then send the proxy an updated copy of the object for storage in the proxy's local cache (step 27).

On the other hand, if the requested object is stored in the cache (affirmative determination in step 21), the proxy will then examine the cache entry to determine if the entry indicates that an active subscription is held on the requested object (step 22). It is to be noted that a server may offer a subscription that never expires. In this instance, the subscription would be active at all times. Further, the server may grant a subscription that is valid for a certain, limited period of time. Upon expiration of such time period the proxy would lose its subscription for the object and the proxy would have to request and obtain another subscription for such object from the server. Thus, in step 22, the proxy checks that the subscription is not only present, but also that the subscription is still active based on the specified expiration time (if any) of the original requested object received from the server.

If it is determined that there is an active subscription associated with the requested object (i.e., the requested object appears to be current based on the subscription expiration time) (affirmative determination in step 22), then the proxy server will send an assuredly current copy of the requested page (i.e., the corresponding cached object) to the client browser (step 24) and enter a "wait" state until it receives another request from a client (step 25).

If the proxy server determines that there is not an active subscription associated with the requested object (negative determination in step 22) (e.g., either the subscription of the requested object has expired or there is simply no subscription for the cached object) (negative determination in step 22), the proxy server will determine if the object is valid (step 23). If the subscription of the object has expired, the object may be deemed not valid by virtue of the subscription being expired (affirmative determination in step 23) (assuming of course there are no other parameters associated with the object that would otherwise render the object valid). Even if there was never a subscription issued for the object, the object may be deemed not valid for other reasons (such as a time-sensitive object that has expired) as is understood by those skilled in the art.

In any event, if an object is deemed not valid (negative determination in step 23), the proxy server will send a request to the server to check the validity of the copy of the object in the local cache of the proxy server (step 26). In response to such request, the server will send the proxy either (i) a confirmation that the object is valid or (ii) an updated copy of the object for storage in the proxy's local cache (step 27). It is to be noted that in some cases, the updated copy may not be cached (in step 27), such as when the page is uncachable or the local cache is full.

It has been determined by the inventors that the rate at which objects at servers are updated can differ dramatically among the different objects, as can the size and importance of the objects. Consequently, the implementation of caching techniques (as described herein in accordance with the invention) in a subscription based framework (such as described in FIG. 2), can afford a significant reduction in the number of update messages sent between servers and caches. This reduction results in less overhead and better scalability as compared with the conventional methods. The following FIGS. 3, 4 and 5 describe various components of a cost-based caching process according to embodiments of the present invention.

Figure 3:
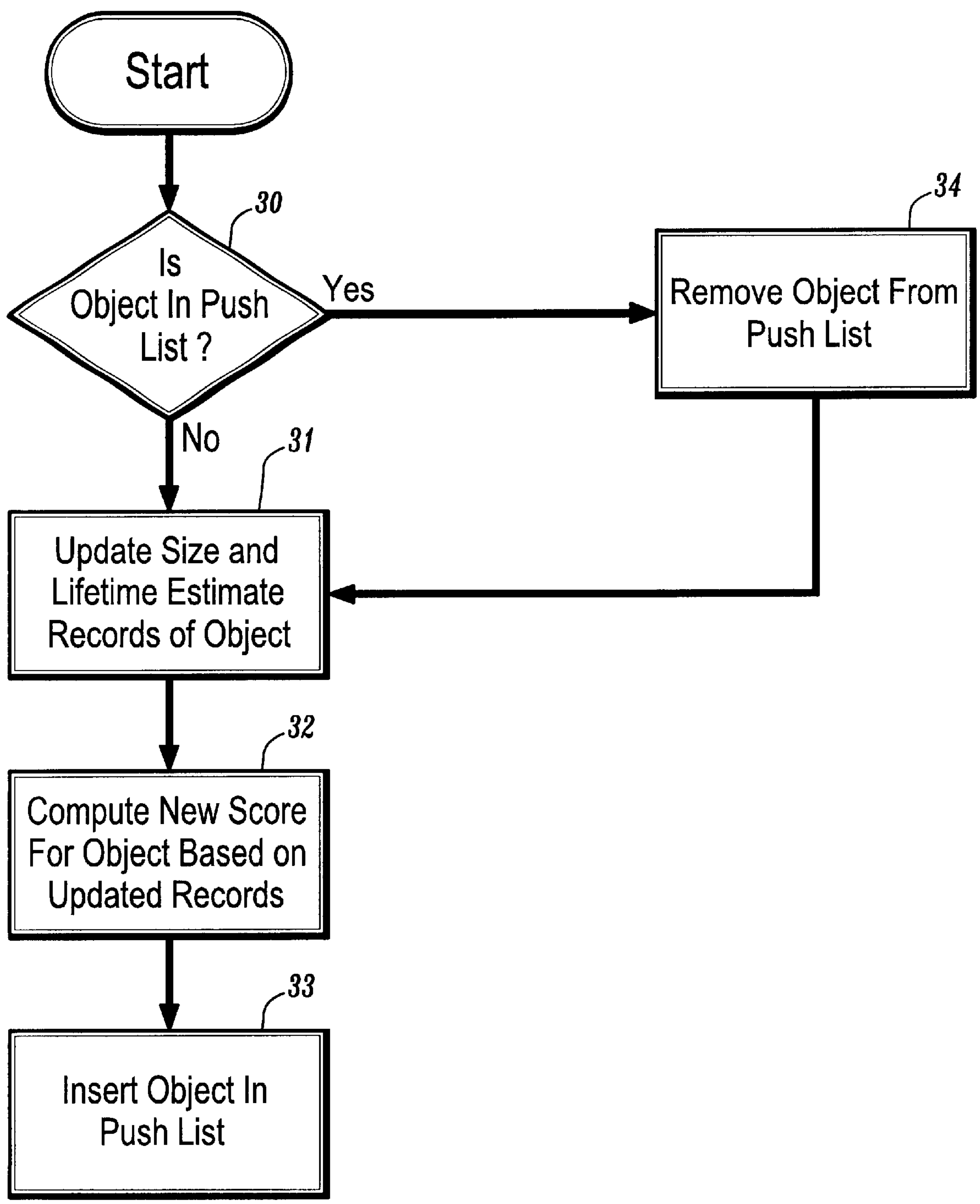
FIG. 3 is a flow diagram of a method implemented by a server for updating an object according to one aspect of the invention.

Referring now to FIG. 3, a flow diagram illustrates a method implemented by a server for updating an object according to one aspect of the invention. The processing of an object update begins with a determination as to whether the desired object (e.g., content page) is listed in what is referred to herein as a "push" list (step 30). A "push" list comprises a list of those objects that have been updated, but the updated versions of which have not yet been sent to all proxies having corresponding active subscriptions for such updated objects. If it is determined that the object is not on the push list (negative determination in step 30), one or more records (parameters) associated with the object are updated (step 31). If it is determined that the object is on the push list (affirmative determination in step 30), then that object is removed from the push list (step 34) (and sent to subscribing proxies as described below with reference to FIG. 4), and one or more records associated with the object are updated.

The process of updating the records of the object (step 31) comprises determining and recording the new size of the object and computing an estimate of the expected lifetime of the new version of the object. It is to be appreciated that the process of estimating the lifetime for the updated object may be performed in one of various manners. For instance, the lifetime may be computed as the time period between the creation of the latest updated version of the object and the creation of the previous version of the same object. Alternatively, the lifetime estimate of the object may be computed as the average length of time a version of the object has lasted based on the number of updates to the object since the object was initially created.

Another method would be to compute a moving average (thereby taking into greater account recent lifetimes of the object) by taking a linear combination of the previous estimate with the most recent lifetime. More specifically, assuming that the lifetime estimate for the object as L(o), the most recent lifetime for the object is l(o), and a smoothing factor is p (where p is preferably a value from 0 to 1), then the new lifetime estimate of the object is preferably computed as:

$$L(o)=1(o)*p+L(o)*(1-p).$$

As the value of p increases, the greater the weight is placed on the most recent lifetime. It is to be understood that other methods may be implemented based on the application.

After the records of the object are updated (step 31), a new score s(o) is computed for the object (step 32), wherein the score is preferably computed as follows:

$$s(o)=L(o)*w(o)/c(o),$$

where L(o)represents the expected lifetime (as computed above), w(o) represents an "importance" weighting of the object, and c(o) represents a cost to the server of sending a copy of the object to the proxy (or otherwise sending an update message to the proxy associated with the object). The "importance" weighting of the object w(o) is a factor that is selected by an administrator of the server as a way to increase the scores of objects whose timely distribution to caches is considered important. This is preferably performed by setting the value of w(o) greater than 1. For objects deemed having ordinary importance, the value of w(o) is preferably set equal to 1.

Further, the cost c(o) of, e.g., sending out a copy of the object o is preferably computed as follows:

$$c\mathbf{1}+[c\mathbf{2}*(\text{size}(o)-c\mathbf{3})],$$

where c1, c2, and c3 are non-negative constants. The constant c1 is correlated with the cost of the message regardless of the object size , constant c2 is correlated with an increasing message cost as the object size increases and constant c3 is a constant that may be implemented depending on the application. By way of example, the constant c3 may be implemented as a correction factor for cases where the growth in cost is not a linear function of object size. Those skilled in the art can readily envision other methods for computing the cost of sending out copies of an object. In particular, instead of sending to the proxy an entire copy of an object whenever it is updated, a server could send a notification that the proxy's copies are out of date. This is preferably represented in the above cost formula by setting the value of c2 and c3 to "0".

After the score s(o) of the updated object is computed (step 32), processing continues by inserting the updated object on the push list (step 33). This is preferably performed such that an object on the push list having the highest score may be readily located. In one embodiment, prioritization is performed by organizing the push list as a priority queue. One skilled in the art can readily envision other methods and data structures that could be implemented for the same purpose.

The method described above with reference to FIG. 3 results in the addition of objects to the push list that is maintained by the server. In addition, the server implements an additional process that preferably removes objects from the push list and sends copies of such objects to subscribing proxies. A preferred process for sending updated copies of objects to subscribing entities is illustrated by the flow diagram of FIG. 4.

Figure 4:
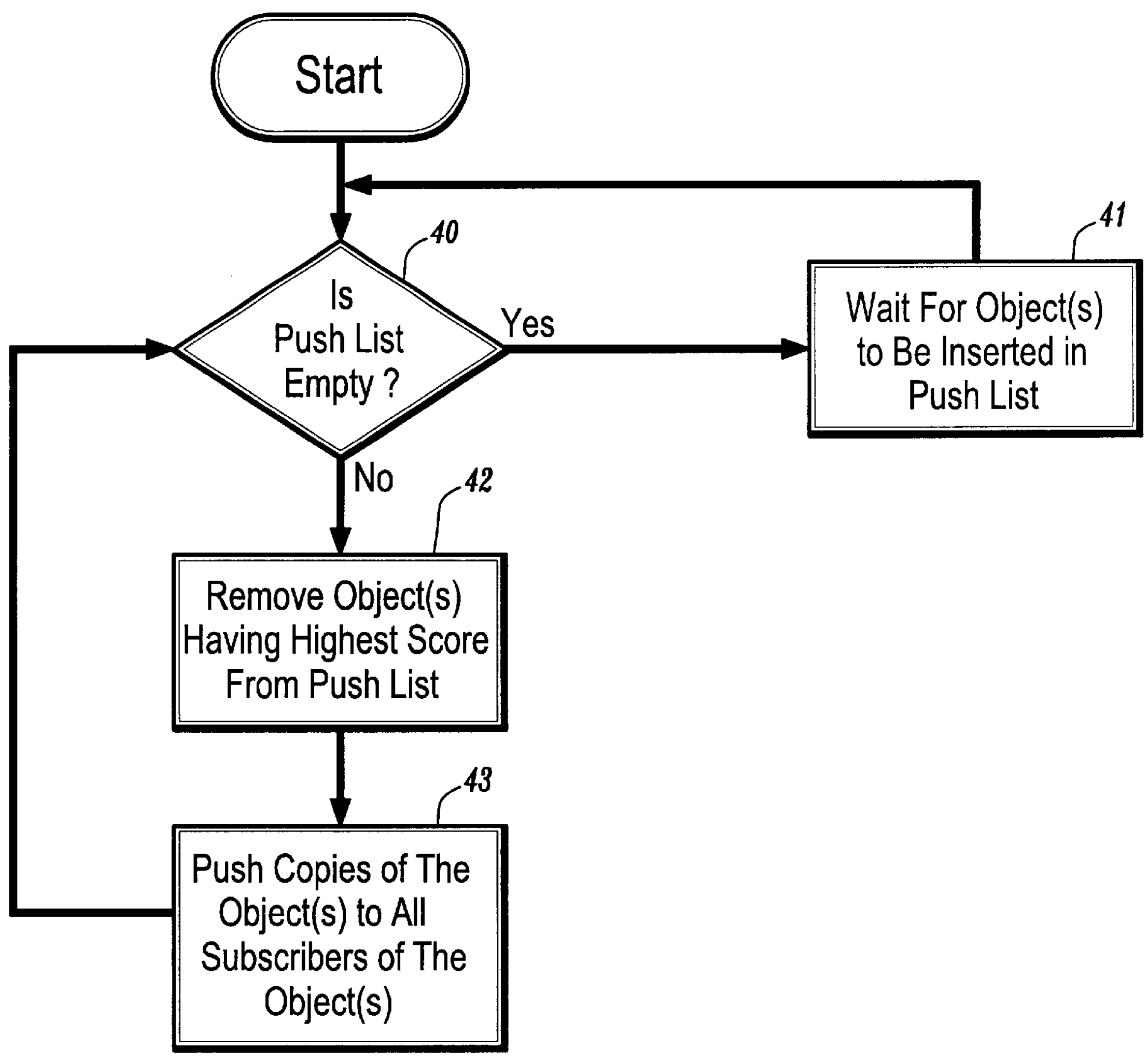
FIG. 4 is a flow diagram of a method implemented by a server for sending updated copies of caches objects to a proxy cache, according to one aspect of the invention.

Referring to FIG. 4, processing begins with a determination as to whether the push list is empty (step 40). If the push list is empty (affirmative determination in step 40), the process enters a "wait" state until one or more objects are inserted onto the push list (step 41) (such as discussed above in FIG. 3). If the push list is not empty (negative determination in step 40), preferably, the object in the push list having the highest score s(o) is removed from the push list (step 42). Then, copies of the removed object are sent by the server to each proxy holding a subscription for the object (step 43). This process is then repeated (return to step 40).

This processing cycle (depicted in FIGS. 3 and 4) may consume a large amount of the server's resources. Advantageously, by processing objects in the push list based on the highest scores, the server may concentrate its efforts on those objects whose timely delivery to subscribing proxy servers is deemed as having greater importance and of most value to the server. This form of processing may lead to delays in the sending of updated copies of objects having lower scores to subscribing proxy servers.

It is to be appreciated that a variety of schemes may be implemented herein to limit a maximum delay in the delivery of new copies of objects having low scores in the push list. For instance, a mechanism may be employed to periodically increase all scores of objects in the push list, thereby continually providing increased importance to those objects (initially having low scores) that have been on the push list for a long period of time. Another approach would be to include an additional factor in the score s(o) of an object that is computed during an update of the object based on the objects having already been on the push list when the new update arrived (i.e., steps 30 and 34, FIG. 3).

In certain instances, it may be acceptable for an object to become obsolete to some acceptable degree (without updating a copy of the object store in a cache), which provides several advantages for subscription-based caching. For instance, it may allow the generating and transmission of fewer update messages to maintain a given cached object. Further, it allows batching of update messages for multiple objects which have not necessarily changed at the same time.

Figure 5:
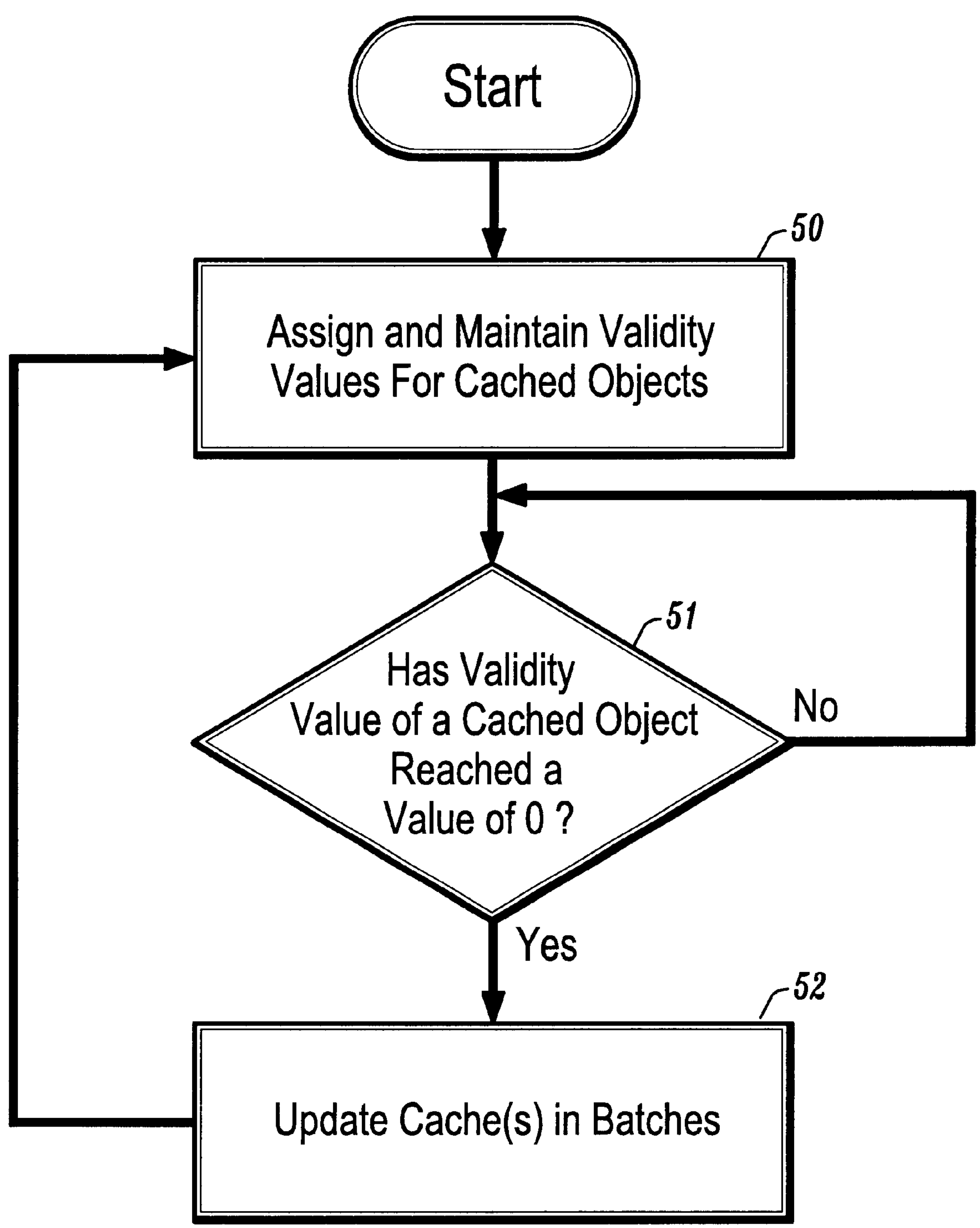
FIG. 5 is a flow diagram of a method implemented by a server for updating caches comprising objects that are obsolete in variable degrees.

FIG. 5 is a flow diagram of a method for maintaining cached data that is obsolete to variable degrees. This process is preferably implemented by the server so as to limit the number of object updates and messages that are sent to a proxy. Preferably, to allow an object to be obsolete to a variable degree within a cache, the server assigns a validity level vl(o) to a cached object (step 50), wherein the value of the validity level vl(o) is an indication of how current/up-to-date the cached object is. Preferably, a validity level vl(o) of value 1 means that the cached object is fully current and a validity level vl(o) of value 0 means that the cached object is too obsolete and needs to be updated. Further, validity levels vl(o) of values between 0 and 1 mean that the cached object is obsolete to variably acceptable degrees, but allowed to remain in cache. It is to be appreciated that other methods of assigning validity level values could readily be implemented by one skilled in the art. The vl(o) values of cached objects are preferably continuously maintained and updated during system operation.

Then, a method of batching updates is preferably performed as follows. The server waits until the vl(o) of a cached object reaches value "0" (step 51). At this stage, the server will invalidate all cached objects (and prefetch updated objects) whose vl(o) values are below a certain threshold by batching as many updates as possible within single messages that are sent to the proxy server (step 52). It is to be appreciated that other methods for updating obsolete pages of variable degrees that are likely to become too obsolete in the near future can be implemented herein.

In another embodiment, updates to expiration times of cached objects are propagated, either via individual messages or batching them with other updates.

Further, a cache can have a subscription for an object which is only valid for a finite amount of time. After the subscription expires, the cache will not receive update messages for the object unless the subscription is renewed.

In addition, update cost and other statistics described herein may be customized to specific caches. This allows different subscription policies to be used for different caches.

It is to be understood that the logic for determining which objects should be subscribed to which caches, as well as what update messages may be sent, might reside on the server 14. This logic might also be distributed between one or more servers, proxy servers, and one or more caches.

Although illustrative embodiments have been described herein with reference to the accompanying drawings, it is to be understood that the present system and method is not limited to those precise embodiments, and that various other changes and modifications may be affected therein by one skilled in the art without departing from the scope or spirit of the invention. All such changes and modifications are intended to be included within the scope of the invention as defined by the appended claims.

What is claimed is:

1. A method for maintaining objects in a cache, comprising the steps of:

issuing a subscription for an object;

maintaining a metric for the object;

determining, based on the metric, whether a cache is to receive an update message associated with the object; and prioritizing an order in which update messages associated with a plurality of objects are sent to corresponding subscribing caches based on the value of the metric associated with each of the objects, wherein the step of prioritizing the order comprises ordering the update messages in decreasing value of the metric.

2. The method of claim 1, further comprising the step of sending the update message to the cache in response to a change to the object, if it is determined, based on the metric, that the cache is to receive the update message associated with the object.

3. The method of claim 2, wherein the update message comprises an invalidation message to invalidate a cached copy of the object.

4. The method of claim 2, wherein the update message comprises an updated copy of the object.

5. The method of claim 1, wherein the subscription is valid for a specified time period.

6. The method of claim 1, wherein the metric is correlated with an importance factor of maintaining a cached copy of the object current.

7. The method of claim 1, wherein the metric is correlated with a cost of sending the update message.

8. The method of claim 1, wherein the metric is correlated with a lifetime of the object.

9. The method of claim 6, further comprising the step of computing the metric, wherein the step of computing the metric comprises multiplying a quantitative estimate of the importance factor by an estimate of a lifetime of the object and dividing by an estimated cost of the update message.

10. The method of claim 7, wherein the cost comprises c1+c2*(size(o)−c3), wherein c1, c2, and c3 are constants, and size(o) comprises a size of the object.

11. The method of claim 1, further comprising the step of adjusting the priority of an update message if the update message has not been sent to a corresponding subscribing cache for a predetermined period of time.

12. The method of claim 1, wherein the method steps are tangibly embodied as program instructions on a program storage device, wherein the program instructions are readable and executable by a machine to perform the method steps.

13. A method for maintaining objects in a cache, comprising the steps of:

issuing a subscription to a plurality of objects;

maintaining a metric for an object of the plurality of objects, wherein the metric is correlated with a validity level of the object; and sending a message to one of update and invalidate a cached copy of the object, if the metric associated with the object meets a predefined threshold, wherein the predefined threshold is met when the validity level of the object indicates that the object is obsolete, and wherein the step of sending a message further comprises batching a plurality of messages in the message, wherein the batched messages are associated with objects having a validity level that meet a second predefined threshold when the validity level of the object meets the predefined threshold.

14. The method of claim 13, wherein the step of sending the message further comprises one of updating and invalidating a cached copy of another object of the plurality of objects.

15. The method of claim 13, wherein the metric is customized to specific caches.

16. The method of claim 13, wherein the method steps are tangibly embodied as program instructions on a program storage device, wherein the program instructions are readable and executable by a machine to perform the method steps.

17. A system, comprising:

a plurality of caches; and a server, wherein the server comprises a plurality of objects that are one of stored and materialized from the server, wherein the server is adapted to execute functions, wherein the functions comprise issuing subscriptions to the caches for copies of the objects, maintaining a metric for each of the objects, and utilizing the metric associated with an object to determine whether to send an update message to a subscribing cache having a cached copy of the object when the object changes, wherein the order in which update messages associated with a plurality of objects are sent to corresponding subscribing caches is prioritized based on the value of the metric associated with each of the objects, and wherein the update messages are ordered in decreasing value of the metric.

18. The system of claim 17, wherein the system is distributed over a computer network.

19. The system of claim 17, further comprising a proxy server, and wherein at least one of the caches is associated with the proxy server.

20. The system of claim 19, wherein the server functions are distributed between the server and proxy server.

21. A method for maintaining objects in a cache, comprising the steps of:

issuing a subscription for an object;

maintaining a metric for the object, wherein the metric is correlated with an importance factor of maintaining a cached copy of the object current;

determining, based on the metric, whether a cache is to receive an update message associated with the object; and further comprising the step of computing the metric, wherein the step of computing the metric comprises multiplying a quantitative estimate of the importance factor by an estimate of a lifetime of the object and dividing by an estimated cost of the update message.

22. The method of claim 21, wherein the method steps are tangibly embodied as program instructions on a program storage device, wherein the program instructions are readable and executable by a machine to perform the method steps.

23. A method for maintaining objects in a cache, comprising the steps of:

issuing a subscription for an object;

maintaining a metric for the object; and determining, based on the metric, whether a cache is to receive an update message associated with the object, wherein the metric is correlated with a cost of sending the update message, wherein the cost comprises c1+c2* (size(o)−c3), wherein c1, c2, and c3 are constants, and size(o) comprises a size of the object.

24. The method of claim 23, wherein the method steps are tangibly embodied as program instructions on a program storage device, wherein the program instructions are readable and executable by a machine to perform the method steps.

* * * * *